(12) United States Patent
Tanaami et al.

(10) Patent No.: US 12,044,590 B2
(45) Date of Patent: Jul. 23, 2024

(54) FORCE SENSOR AND FITTING SYSTEM

(71) Applicant: SINTOKOGIO, LTD., Nagoya (JP)

(72) Inventors: Yoshikane Tanaami, Nagoya (JP); Koji Ito, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 108 days.

(21) Appl. No.: 17/700,192

(22) Filed: Mar. 21, 2022

(65) Prior Publication Data

US 2022/0307928 A1 Sep. 29, 2022

(30) Foreign Application Priority Data

Mar. 24, 2021 (JP) ................................. 2021-050823

(51) Int. Cl.
*G01L 5/00* (2006.01)
*B25J 9/16* (2006.01)
*B25J 19/02* (2006.01)
*G01L 1/22* (2006.01)
*G01L 5/1627* (2020.01)

(52) U.S. Cl.
CPC ........... *G01L 5/1627* (2020.01); *B25J 9/1612* (2013.01); *B25J 19/02* (2013.01); *G01L 1/2287* (2013.01)

(58) Field of Classification Search
CPC .... G01L 5/1627; G01L 1/2287; B25J 9/1612; B25J 19/02
USPC ...................................... 73/862.041, 862.045
See application file for complete search history.

(56) References Cited

U.S. PATENT DOCUMENTS

| 4,640,138 | A | * | 2/1987 | Meyer | G01L 5/1627 |
| | | | | | 73/862.045 |
| 6,162,189 | A | * | 12/2000 | Girone | A63B 23/08 |
| | | | | | 600/595 |
| 8,270,599 | B2 | * | 9/2012 | Verghese | H04L 69/04 |
| | | | | | 713/153 |
| 9,172,771 | B1 | * | 10/2015 | Gross | H04L 43/16 |
| 9,616,172 | B2 | * | 4/2017 | Ambrosina | A61M 5/14593 |
| 9,720,456 | B1 | * | 8/2017 | Karakotsios | G06F 1/1694 |
| 10,175,737 | B1 | * | 1/2019 | Kong | G06F 1/30 |
| 2009/0301217 | A1 | * | 12/2009 | Kurtz | G01L 5/223 |
| | | | | | 73/847 |

(Continued)

FOREIGN PATENT DOCUMENTS

JP 2019-78561 A 5/2019
JP 2020-56729 A 4/2020
JP 2020-118642 A 8/2020

*Primary Examiner* — Max H Noori
(74) *Attorney, Agent, or Firm* — Harness, Dickey & Pierce, P.L.C.

(57) ABSTRACT

A force sensor includes a force receiver which receives a force or a moment that acts on a detection target part, and a strain element which is provided to a sensor base and which serves as an elastic support that supports the force receiver. The force sensor includes two systems of detecting sections which each independently detect strain of four beam parts of the strain element, two systems of computing circuits which each independently compute, on the basis of a detection result that has been outputted from a corresponding one of the two systems of detecting sections, the force or the moment that acts on the detection target part, and two systems of output sections which each independently output, as an electrical signal, a computation result that has been outputted from a corresponding one of the two systems of computing circuits.

5 Claims, 10 Drawing Sheets

(56) References Cited

U.S. PATENT DOCUMENTS

2016/0294210 A1* 10/2016 Nguyen ................. H02J 9/061
2019/0317127 A1* 10/2019 Sadeghian Marnani ....................
                                                        G01Q 70/02
2020/0240865 A1    7/2020 Ogawa

* cited by examiner

FORCE SENSOR AND FITTING SYSTEM

This Nonprovisional application claims priority under 35 U.S.C. § 119 on Patent Application No. 2021-050823 filed in Japan on Mar. 24, 2021, the entire contents of which are hereby incorporated by reference.

TECHNICAL FIELD

The present invention relates to a force sensor which detects a force or a moment which acts on a detection target part, and to a fitting system for fitting a fitting workpiece into a fitting target workpiece.

BACKGROUND ART

For example, when force control is carried out on a robot, a force sensor is used. A force sensor includes: a sensor base; a force receiver which receives a force or a moment that acts on a detection target part such as a base of a hand of a robot; and an elastic support which is provided to the sensor base and which supports the force receiver. The elastic support has, at least in part, an elastic part which is elastically deformable. The force sensor includes: a strain gauge type detecting section which detects strain of the elastic part of the elastic support; a computing circuit which computes, on the basis of a detection result that has been outputted from the strain gauge type detecting section, the force or the moment that acts on the detection target part, and an output section which outputs, as an electrical signal, a computation result that has been outputted from the computing circuit (see Patent Literature 1).

Note that a force sensor is also widely known which includes, instead of a strain gauge type detecting section, a capacitive detecting section which electrically detects displacement of an elastic part of an elastic support or an optical detecting section which optically detect the displacement of the elastic part of the elastic support (see Patent Literatures 2 and 3).

CITATION LIST

Patent Literature

Patent Literature 1

Japanese Patent Application Publication, Tokukai, No. 2020-56729

Patent Literature 2

Japanese Patent Application Publication, Tokukai, No. 2020-118642

Patent Literature 3

Japanese Patent Application Publication, Tokukai, No. 2019-78561

SUMMARY OF INVENTION

Technical Problem

In a conventional force sensor, a single system of detecting section detects strain or displacement of an elastic part of an elastic support, and a single system of output section outputs, as an electrical signal, a force or a moment which acts on a detection target part. Therefore, it is impossible to determine whether or not the force sensor has an abnormality (failure). Therefore, there is a problem that, for example, even in a case where an abnormality occurs in the force sensor in the middle of force control on a robot, such a state continues and, accordingly, it is impossible to stably carry out the force control on the robot and the like.

Thus, an object of an aspect of the present invention is to determine whether or not a force sensor has an abnormality and stably carry out force control on a robot and the like.

Solution to Problem

In order to attain the above object, a force sensor in accordance with an aspect of the present invention includes a sensor base, a force receiver, an elastic support, two systems of detecting sections, two systems of computing circuits (two computing circuits), and two systems of output sections (two output sections). The force receiver receives a force or a moment that acts on a detection target part. The elastic support is provided to the sensor base, has, at least in part, an elastic part that is elastically deformable, and supports the force receiver. The two systems of detecting sections each independently detect strain or displacement of the elastic part of the elastic support. The two systems of computing circuits each independently compute, on the basis of a detection result that has been outputted from a corresponding one of the two systems of detecting sections, the force or the moment that acts on the detection target part. The two systems of output sections each independently output, as an electrical signal, a computation result that has been outputted from a corresponding one of the two systems of computing circuits.

Further, in order to attain the above object, a fitting system in accordance with an aspect of the present invention includes a robot, the foregoing force sensor, a table device, a robot controller, and a table controller. The robot has an arm that is an articulated arm and a hand that is provided on an extreme end side of the arm and that holds a fitting workpiece. The force sensor is disposed between a base of the hand and an extreme end of the arm, and detects a force or a moment that acts on the hand. The table device supports a fitting target workpiece such that an attitude of the fitting target workpiece can be changed. When the fitting workpiece is to be fitted into the fitting target workpiece, the robot controller carries out, on the basis of a computation result that has been outputted from one of two systems of output sections of the force sensor, force control on the robot so that an attitude of the fitting workpiece is adjusted. When the fitting workpiece is to be fitted into the fitting target workpiece, the table controller carries out, on the basis of a computation result that has been outputted from the other of the two systems of output sections of the force sensor, force control on the table device so that the attitude of the fitting target workpiece is adjusted.

Advantageous Effects of Invention

According to an aspect of the present invention, it is possible to determine whether or not a force sensor has an abnormality and stably carry out force control on a robot and the like.

DESCRIPTION OF EMBODIMENTS

The following description will discuss embodiments of the present invention with reference to drawings. As illustrated in the drawings, the direction of the central axis of a force sensor is referred to as a Z-axis direction, and two directions perpendicular to the direction of the central axis of the force sensor are respectively referred to as an X-axis direction and a Y-axis direction.

Embodiment 1

A force sensor 10 in accordance with Embodiment 1 will be described with reference to FIGS. 1 to 5.

As illustrated in FIGS. 1 to 4, the force sensor 10 in accordance with Embodiment 1 is a six-axis force sensor which detects forces in respective axial directions (X-axis direction, Y-axis direction, and Z-axis direction) and moments about respective axes (X axis, Y axis, and Z axis) which act on a detection target part S. The force sensor 10 is disposed between the detection target part S and a facing part T which faces the detection target part S. Note that the force sensor 10 is not limited to the six-axis force sensor, and may be a force sensor which detects a force in a given axial direction or a moment about a given axis.

The force sensor 10 includes a sensor base 12 which has a tube-like shape. The sensor base 12 is attached to the facing part T. The sensor base 12 has two corner portions 12a and 12b on both sides thereof in the X-axis direction.

On one side of the sensor base 12 in the Z-axis direction, a force receiver 14 which has a disk-like shape and which receives the forces and the moments that act on the detection target part S is provided. The force receiver 14 is attached to the detection target part S. Between the force receiver 14 and the sensor base 12, a small clearance C of, for example, approximately 1 mm is formed in the Z-axis direction. The force receiver 14 is allowed to make, with respect to the sensor base 12, a movement which varies depending on the clearance C.

Figure 1:
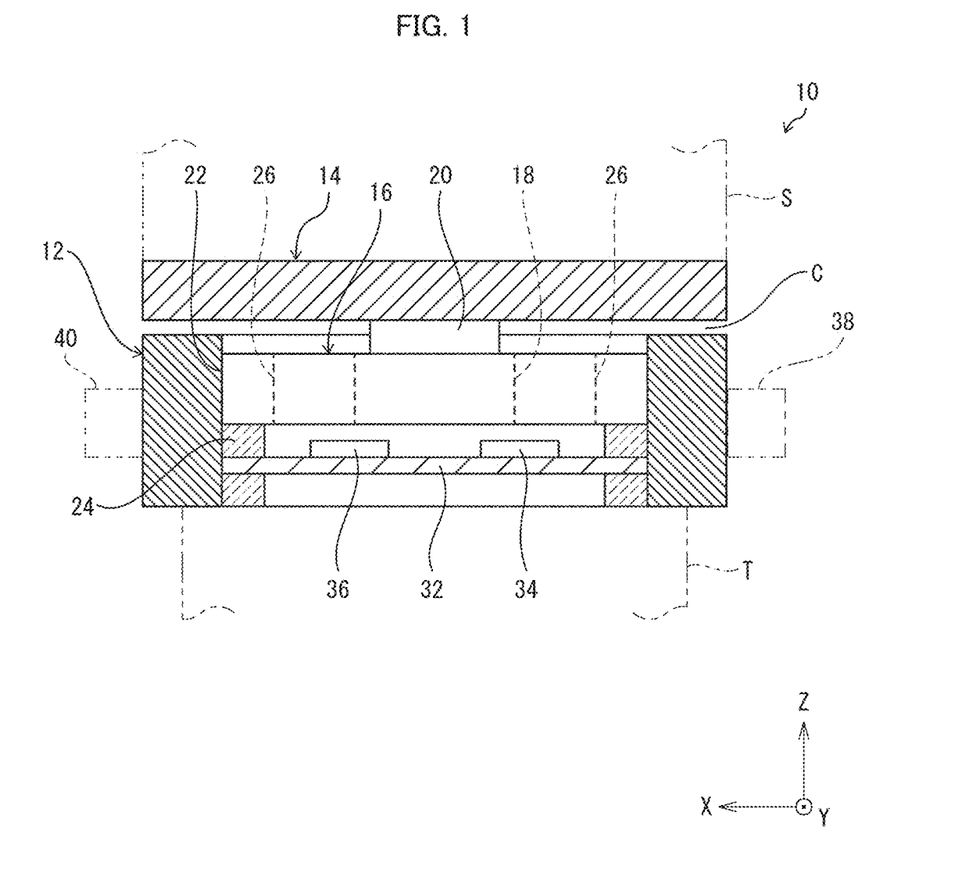
FIG. 1 is a longitudinal cross-sectional view schematically illustrating a force sensor in accordance with Embodiment 1.
Figure 5:
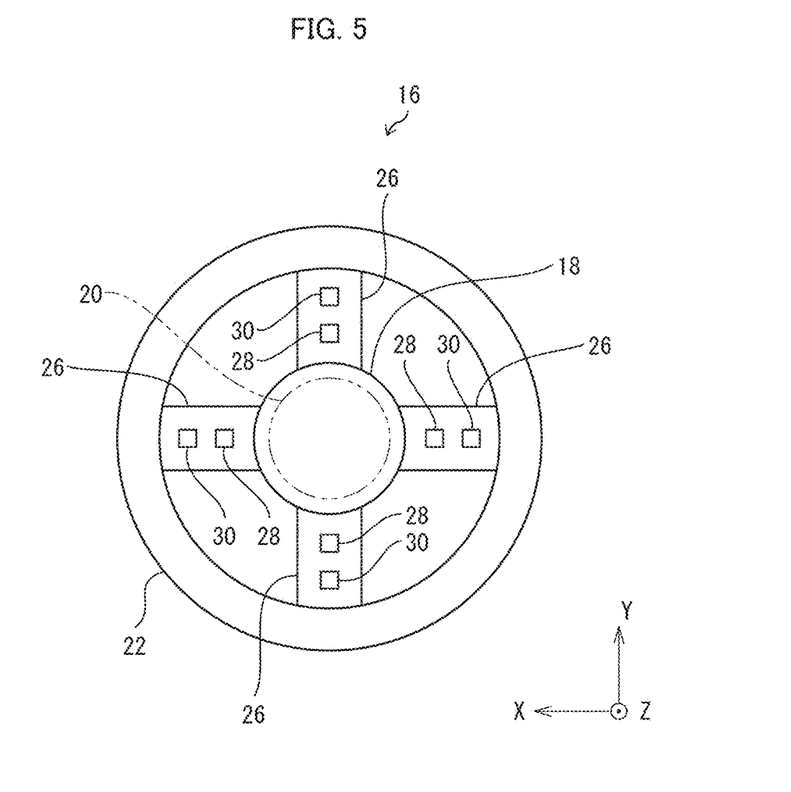
FIG. 5 is a plan view schematically illustrating a strain element of the force sensor in accordance with Embodiment 1.

As illustrated in FIGS. 1 and 5, a strain element 16 which serves as an elastic support that supports the force receiver 14 is provided in the sensor base 12. The strain element 16 is located concentrically with the force receiver 14. The strain element 16 has a core part 18 which has a disk-like shape. The core part 18 is fixed to the force receiver 14 via a coupling member 20 which has a cylinder-like shape. The strain element 16 has a ring part 22 which surrounds the core part 18. The ring part 22 is fixed to the sensor base 12 via a spacer 24 which has an annular shape. The strain element 16 has four beam parts 26 which are provided so as to be coupled to an outer circumferential surface of the core part 18 and an inner circumferential surface of the ring part 22. The four beam parts 26 are disposed at regular intervals along a circumferential direction. The four beam parts 26 correspond to an elastic part which is elastically deformable, in a case where the core part 18 and the ring part 22 are regarded as rigid bodies. Note that the number of beam parts 26 is not limited to four, and is only necessary to be three or more.

As illustrated in FIG. 5, first detecting sections 28 which detect strain of the respective beam parts 26 are provided to the respective beam parts 26. Each of the first detecting sections 28 has a plurality of strain gauges (not illustrated) which are respectively disposed on a front surface and a back surface of a corresponding one of the beam parts 26. Second detecting sections 30 which, independently of the first detecting sections 28, detect the strain of the respective beam parts 26 are provided to the respective beam parts 26. Each of the second detecting sections 30 has a plurality of strain gauges (not illustrated) which are respectively disposed on a front surface and a back surface of a corresponding one of the beam parts 26. Namely, the strain element 16, which serves as the elastic support, includes two systems of strain gauge type detecting sections which each independently detect the strain of the four beam parts 26, which serve as the elastic part. The four first detecting sections 28 constitute one of the two systems of strain gauge type detecting sections which independently detects the strain of the four beam parts 26. The four second detecting sections 30 constitute the other of the two systems of strain gauge type detecting sections which independently detects the strain of the four beam parts 26. That is, the two systems of strain gauge type detecting sections (the first detecting sections 28 and the second detecting sections 30) each independently detect strain of the elastic part (the beam parts 26) of the elastic support (the strain element 16).

Note that, instead of the two systems of strain gauge type detecting sections, the force sensor 10 may include two systems of capacitive detecting sections (not illustrated) which each independently electrically detect displacement of the four beam parts 26 or two systems of optical detecting sections (not illustrated) which each independently optically detect the displacement of the four beam parts 26. That is, the two systems of detecting sections (the first detecting sections 28 and the second detecting sections 30) each independently detect the strain or the displacement of the beam parts (26).

As illustrated in FIG. 1, a substrate 32 for controlling a detecting operation of the force sensor 10 in an integrated manner is disposed in the sensor base 12. The substrate 32 is implemented with a first computing circuit which has a processor (not illustrated). The first computing circuit 34 computes the forces and the moments which act on the detection target part S, on the basis of detection results that have been outputted from the four first detecting sections 28, which constitute one of the two systems of detecting sections. The substrate 32 is implemented with a second computing circuit 36 which has a processor (not illustrated). The second computing circuit 36 computes the forces and the moments which act on the detection target part S, on the basis of detection results that have been outputted from the four second detecting sections 30, which constitute the other of the two systems of detecting sections. In other words, the first computing circuit 34 and the second computing circuit 36 which constitute two systems of computing circuits each independently compute the forces and the moments which act on the detection target part S, on the basis of detection results that have been outputted from a corresponding one of the two systems of strain gauge type detecting sections. Since a specific computation method which is carried out by each of the first computing circuit 34 and the second computing circuit 36 is publicly known, a description thereof will be omitted.

Figure 2:
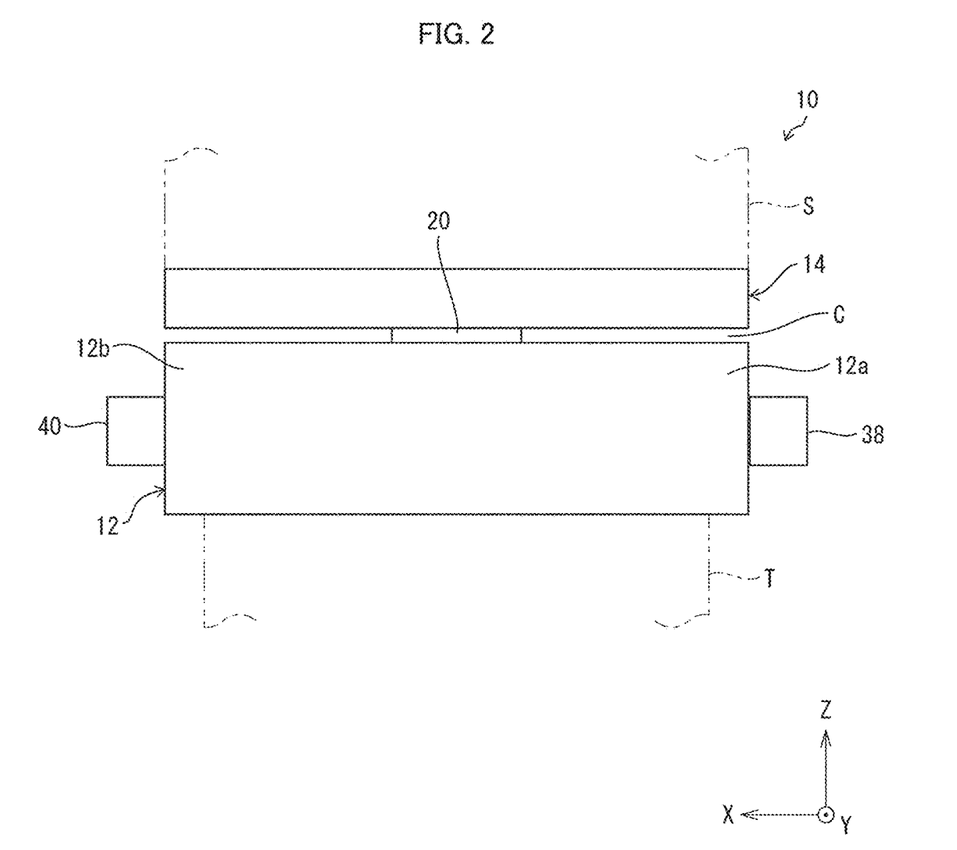
FIG. 2 is an elevational view schematically illustrating the force sensor illustrated in FIG. 1.
Figure 3:
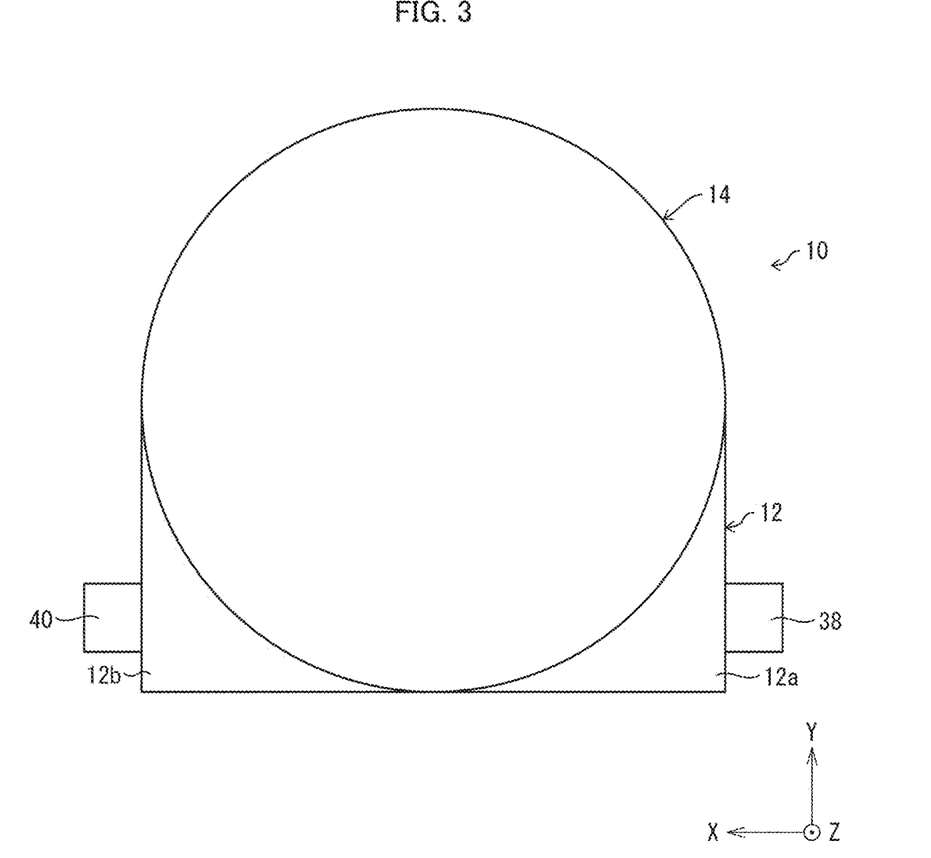
FIG. 3 is a plan view schematically illustrating the force sensor illustrated in FIG. 1.
Figure 4:
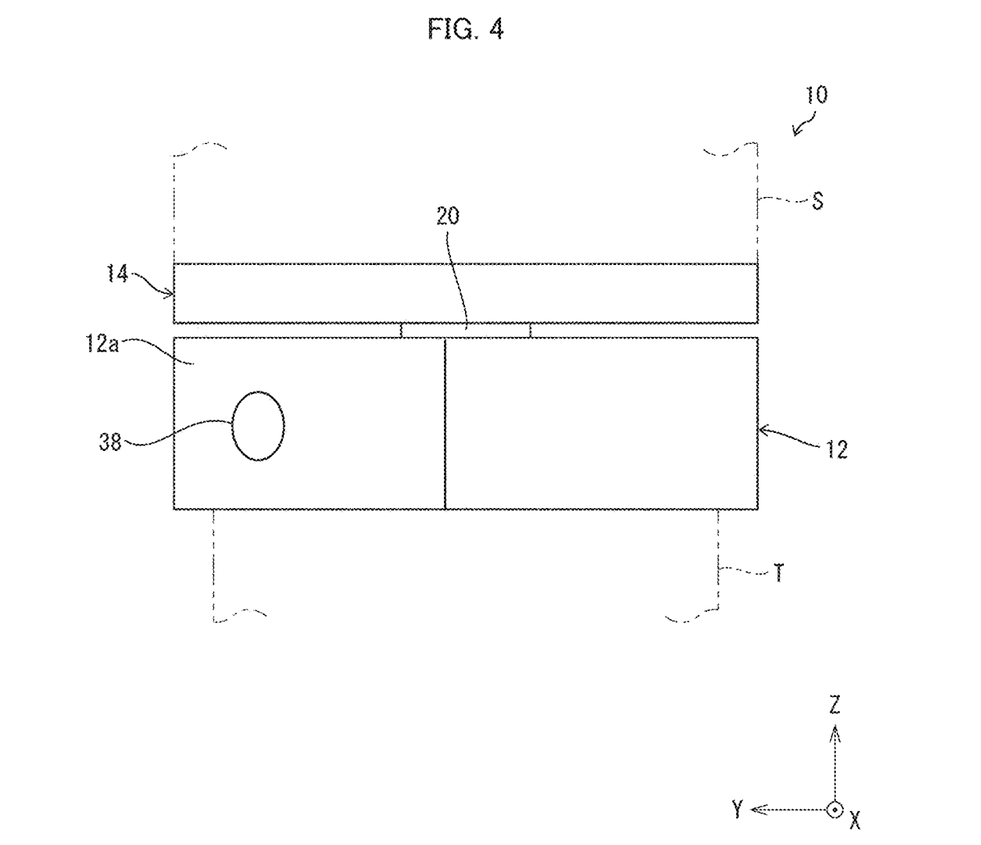
FIG. 4 is a side view schematically illustrating the force sensor illustrated in FIG. 1.

As illustrated in FIGS. 1 and 2, in a vicinity of one corner portion 12a of the sensor base 12, a first interface 38 is provided which serves as a first output section that outputs, as electrical signals, computation results that have been outputted from the first computing circuit 34. The first interface 38 is connected to the first computing circuit 34. In a vicinity of the other corner portion 12b of the sensor base 12, a second interface 40 is provided which serves as a second output section that outputs, as electrical signals, computation results that have been outputted from the second computing circuit 36. The second interface 40 is connected to the second computing circuit 36. That is, the sensor base 12 is provided with two systems of output sections (the first interface 38 and the second interface 40) which each independently output, as electrical signals, computation results that have been outputted from a corresponding one of the two systems of computing circuits (the first computing circuit 34 and the second computing circuit 36).

The two systems of strain gauge type detecting sections (the four first detecting sections 28 and the four second detecting sections 30) each independently detect the strain of the four beam parts 26. The first computing circuit 34 computes the forces and the moments which act on the detection target part S, on the basis of the detection results that have been outputted from the four first detecting sections 28, which constitute one of the two systems of detecting sections. The second computing circuit 36 computes the forces and the moments which act on the detection target part S, on the basis of the detection results that have been outputted from the four second detecting sections 30, which constitute the other of the two systems of detecting sections. The first interface 38 outputs, as electrical signals, the computation results that have been outputted from the first computing circuit 34, and the second interface 40 outputs, as electrical signals, the computation results that have been outputted from the second computing circuit 36.

Therefore, it is possible to determine whether or not differences between (i) the forces and the moments which have been outputted from the first interface 38 and (ii) the forces and the moments which have been outputted from the second interface 40 are each higher than an abnormality determination threshold. In a case where the differences are each higher than the abnormality determination threshold, it is determined that "the force sensor 10 has an abnormality". In a case where the differences are each not higher than the abnormality determination threshold, it is determined that "the force sensor 10 does not have an abnormality". Note, here, that the abnormality determination threshold is a threshold in accordance with which it is determined whether or not the force sensor 10 has an abnormality. A main body which determines whether or not the differences are each higher than the abnormality determination threshold is an external controller (not illustrated) which is electrically connected to the force sensor 10, but may be alternatively the force sensor 10 itself.

Therefore, in Embodiment 1, it is possible to determine whether or not the force sensor 10 has an abnormality and stably carry out force control on a robot and the like each of which employs the force sensor 10.

As has been described, the two systems of detecting sections (the first detecting sections 28 and the second detecting sections 30) each independently detect strain or displacement of the elastic part (the beam parts 26) of the elastic support (the strain element 16). The two systems of computing circuits (the first computing circuit 34 and the second computing circuit 36) each independently compute a force or a moment which acts on the detection target part (S), on the basis of a detection result that has been outputted from a corresponding one of the two systems of detecting sections. The two systems of output sections (the first interface 38 and the second interface 40) each independently output, as an electrical signal, a computation result that has been outputted from a corresponding one of the two systems of computing circuits. Therefore, it is possible to determine whether or not a difference between (i) the force or the moment which has been outputted from one of the two systems of output sections and (ii) the force or the moment which has been outputted from the other of the two systems of output sections is higher than the abnormality determination threshold. Therefore, it is possible to determine whether or not the force sensor has an abnormality and stably carry out force control on a robot and the like each of which employs the force sensor.

Embodiment 2

Figure 6:
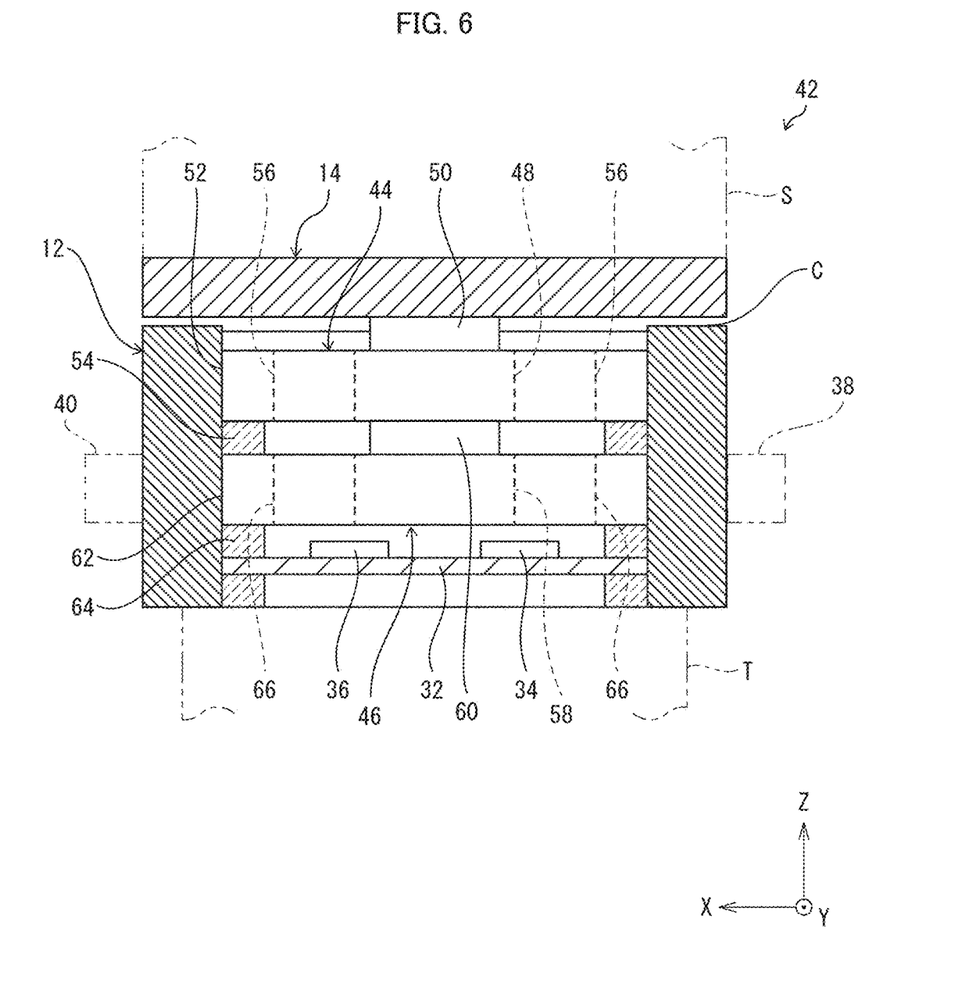
FIG. 6 is a longitudinal cross-sectional view schematically illustrating a force sensor in accordance with Embodiment 2.
Figure 7:
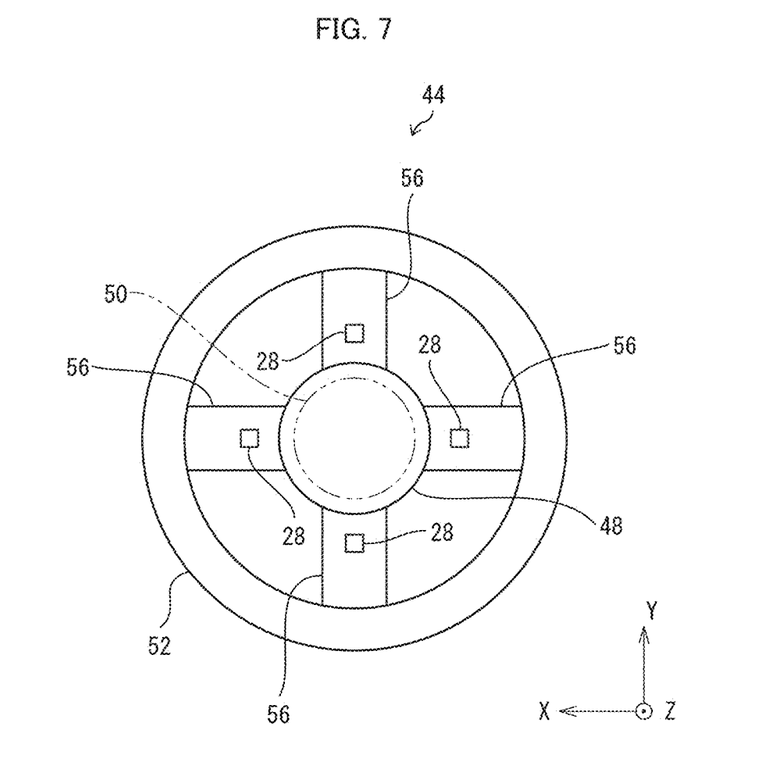
FIG. 7 is a plan view schematically illustrating a first strain element of the force sensor in accordance with Embodiment 2.
Figure 8:
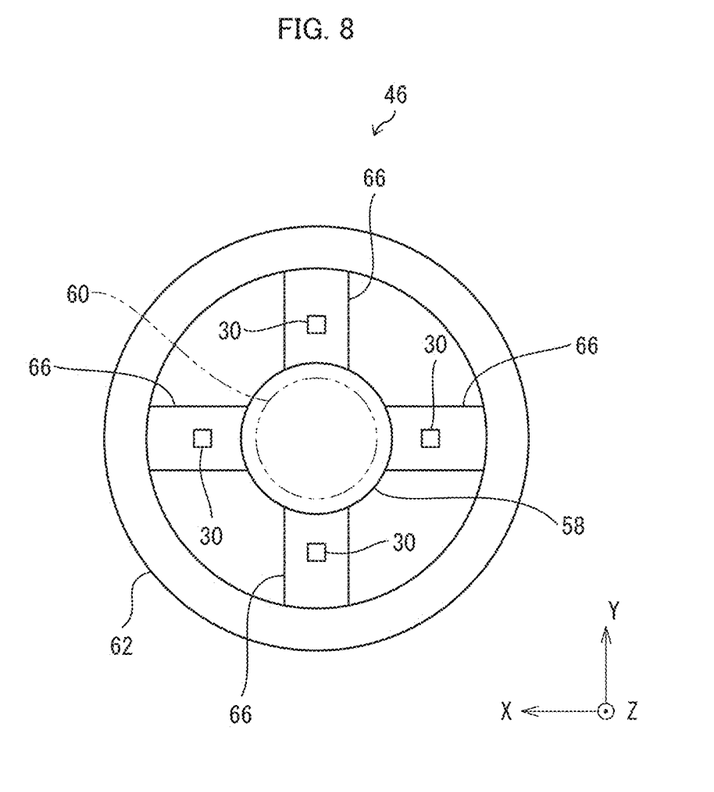
FIG. 8 is a plan view schematically illustrating a second strain element of the force sensor in accordance with Embodiment 2.

The following description will discuss another embodiment of the present invention with reference to FIGS. 6 to 8. For convenience, members which have the same functions as those of the members which have been described in Embodiment 1 are denoted by the same reference numerals, and the descriptions thereof will not be repeated.

As illustrated in FIG. 6, a force sensor 42 in accordance with Embodiment 2 is a six-axis force sensor which detects forces in respective axial directions (X-axis direction, Y-axis direction, and Z-axis direction) and moments about respective axes (x axis, Y axis, and Z axis) which act on a detection target part S. The force sensor 42 is disposed between the detection target part S and a facing part T which faces the detection target part S. The force sensor 42 has features similar to those of the force sensor 10 (see FIG. 1), except for some features. Thus, only the features of the force sensor 42 which differ from those of the force sensor 10 will be described. Note that the force sensor 42 is not limited to the six-axis force sensor, and may be a force sensor which detects a force in a given axial direction or a moment about a given axis.

As illustrated in FIGS. 6 and 7, the force sensor 42 includes, as an elastic support, a first strain element 44 and a second strain element 46 which are superposed on each other in a Z-axis direction, instead of the strain element 16 (see FIG. 5). Specific configurations of the first strain element 44 and the second strain element 46 are as follows.

The first strain element 44 which constitutes a part of the elastic support is provided in a sensor base 12. The first strain element 44 is located concentrically with a force receiver 14. The first strain element 44 has a first core part 48 which has a disk-like shape. The first core part 48 is fixed to the force receiver 14 via a first coupling member 50 which has a cylinder-like shape. The first strain element 44 has a first ring part 52 which surrounds the first core part 48. The first ring part 52 is fixed to the sensor base 12 via a first spacer 54 which has an annular shape. The first strain element 44 has four first beam parts 56 which are provided so as to be coupled to an outer circumferential surface of the first core part 48 and an inner circumferential surface of the first ring part 52. The four first beam parts 56 are disposed at regular intervals along a circumferential direction. The four first beam parts correspond to an elastic part which is elastically deformable, in a case where the first core part 48 and the first ring part 52 are regarded as rigid bodies. Note that the number of first beam parts 56 is not limited to four, and is only necessary to be three or more.

As illustrated in FIGS. 6 and 8, the second strain element 46 which constitutes a part of the elastic support is provided in the sensor base 12. The second strain element 46 is located concentrically with the first strain element 44, and is superposed on the first strain element 44. The second strain element 46 has a second core part 58 which has a disk-like shape. The second core part 58 is fixed to the first core part 48 of the first strain element 44 via a second coupling member 60 which has a cylinder-like shape. The second strain element 46 has a second ring part 62 which surrounds the second core part 58. The second ring part 62 is fixed to the sensor base 12 via a second spacer 64 which has an annular shape. The second strain element 46 has four second beam parts 66 which are provided so as to be coupled to an outer circumferential surface of the second core part 58 and an inner circumferential surface of the second ring part 62. The four second beam parts 66 are disposed at regular intervals along the circumferential direction. The four second beam parts 66 correspond to the elastic part which is elastically deformable, in a case where the second core part 58 and the second ring part 62 are regarded as rigid bodies. The four second beam parts 66 are configured such that when the force receiver 14 receives the forces and the moments, the four second beam parts 66 have strain corresponding to strain of the four first beam parts 56. Note that the number of second beam parts 66 is not limited to four, and is only necessary to be three or more.

As illustrated in FIGS. 6 to 8, in Embodiment 2, first detecting sections 28 are provided to the respective first beam parts 56 of the first strain element 44, not to the respective beam parts 26 of the strain element 16. The first detecting sections 28 detect strain of the respective first beam parts 56 of the first strain element 44. Each of the first detecting sections 28 has a plurality of strain gauges (not illustrated) which are respectively disposed on a front surface and a back surface of a corresponding one of the first beam parts 56 of the first strain element 44. Second detecting sections 30 are provided to the respective second beam parts 66 of the second strain element 46, not to the respective beam parts 26 of the strain element 16. The second detecting sections 30 detect strain of the respective second beam parts 66 of the second strain element 46. Each of the second detecting sections 30 has a plurality of strain gauges (not illustrated) which are respectively disposed on a front surface and a back surface of a corresponding one of the second beam parts 66 of the second strain element 46. Namely, the elastic support (the first strain element 44 and the second strain element 46) includes two systems of strain gauge type detecting sections which each independently detect the strain of the elastic part (the four first beam parts 56 and the four second beam parts 66). One of the two systems of strain gauge type detecting sections detects the strain of the four first beam parts 56, and the other of the two systems of strain gauge type detecting sections detects the strain of the four second beam parts 66.

Note that, instead of one of the two systems of strain gauge type detecting sections, the force sensor 42 may include one system of capacitive detecting sections (not illustrated) which electrically detects displacement of the four first beam parts 56 or one system of optical detecting sections (not illustrated) which optically detects the displacement of the four first beam parts 56. Note that, instead of the other of the two systems of strain gauge type detecting sections, the force sensor 42 may include another system of capacitive detecting sections (not illustrated) which electrically detects displacement of the four second beam parts 66 or another system of optical detecting sections (not illustrated) which optically detects the displacement of the four second beam parts 66.

One (the four first detecting sections 28) of the two systems of strain gauge type detecting sections detects the strain of the four first beam parts 56. The other (the four second detecting sections 30) of the two systems of strain gauge type detecting sections detects the strain of the four second beam parts 66. A first computing circuit 34 computes the forces and the moments which act on the detection target part S, on the basis of detection results that have been outputted from the four first detecting sections 28, which constitute one of the two systems of detecting sections. The second computing circuit 36 computes the forces and the moments which act on the detection target part S, on the basis of detection results that have been outputted from the four second detecting sections 30, which constitute the other of the two systems of detecting sections. A first interface 38 outputs, as electrical signals, computation results that have been outputted from the first computing circuit 34, and a second interface 40 outputs, as electrical signals, computation results that have been outputted from the second computing circuit 36.

Therefore, it is possible to determine whether or not differences between (i) the forces and the moments which have been outputted from the first interface 38 and (ii) the forces and the moments which have been outputted from the second interface 40 are each higher than an abnormality determination threshold. In a case where the differences are each higher than the abnormality determination threshold, it is determined that "the force sensor 42 has an abnormality". In a case where the differences are each not higher than the abnormality determination threshold, it is determined that "the force sensor 42 does not have an abnormality".

Therefore, in Embodiment 2, it is possible to determine whether or not the force sensor 42 has an abnormality and stably carry out force control on a robot and the like each of which employs the force sensor 42. In particular, also in a case where one of the first strain element 44 and the second strain element 46, each of which is a part of the elastic support, has permanent strain, it is possible to determine that the force sensor 42 has an abnormality and more stably carry out the force control on the robot and the like each of which employs the force sensor 42.

As has been described, the one (the first detecting sections 28) of the two systems of detecting sections detects strain or displacement of the first beam parts (56). The other (the second detecting sections 30) of the two systems of detecting sections detects strain or displacement of the second beam parts (66). With this configuration, also in a case where one of the first strain element (44) and the second strain element (46), i.e., a part of the elastic support (the first strain element 44 and the second strain element 46) has permanent strain, it is possible to determine that the force sensor (42) has an abnormality.

Embodiment 3

Figure 9:
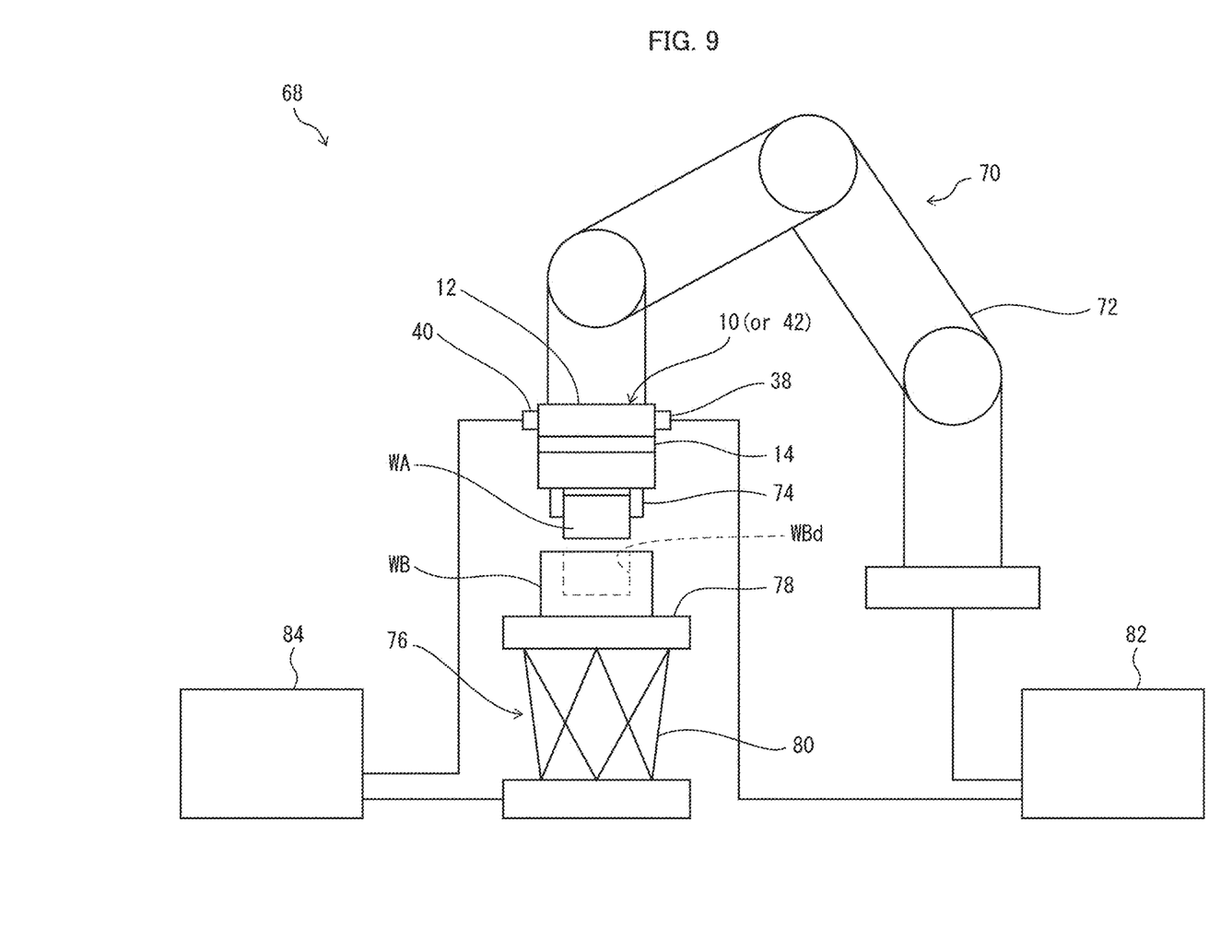
FIG. 9 is a schematic view illustrating a fitting system in accordance with Embodiment 3.
Figure 10:
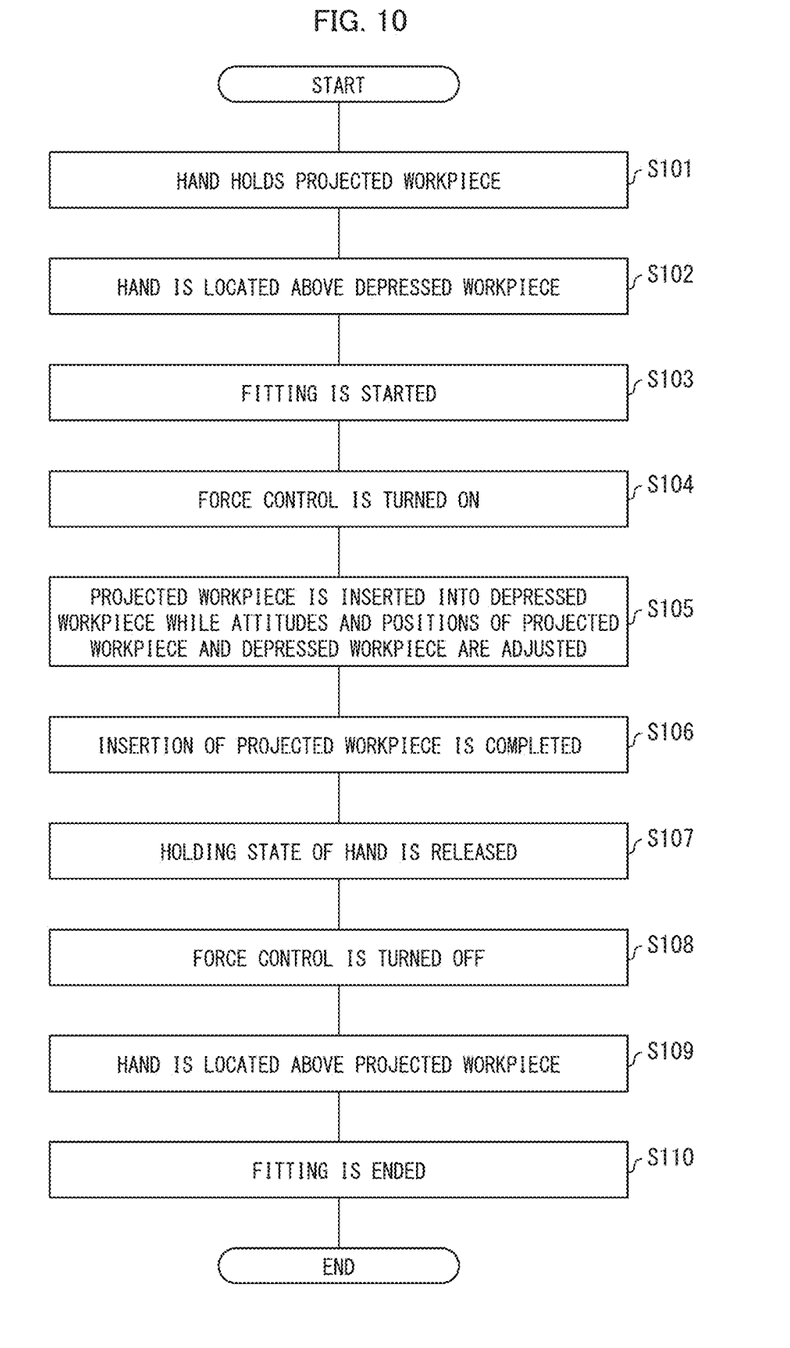
FIG. 10 is a flowchart illustrating an operation of the fitting system illustrated in FIG. 9.

The following description will discuss another embodiment of the present invention with reference to FIGS. 9 and 10. For convenience, members which have the same functions as those of the members which have been described in Embodiments 1 and 2 are denoted by the same reference numerals, and the descriptions thereof will not be repeated.

As illustrated in FIG. 9, a fitting system 68 in accordance with Embodiment 3 is a system for fitting a projected workpiece WA, which serves as a fitting workpiece, into a depressed workpiece WB, which serves as a fitting target workpiece. A specific configuration of the fitting system 68 is as follows.

The fitting system 68 includes a robot 70 which initiatively carries out an operation of fitting the projected workpiece WA. The robot 70 includes an arm 72 which is an articulated arm and a hand 74 which is provided to an extreme end of the arm 72 and which holds the projected workpiece WA.

The fitting system 68 includes a force sensor 10 (or 42) which detects forces and moments which act on the hand 74. The force sensor 10 (or 42) is configured as has been described, and is disposed between a base of the hand 74, which serves as a detection target part S (see FIG. 1), and the extreme end of the arm 72, which serves as a facing part T (see FIG. 1).

The fitting system 68 includes a Stewart platform type table device 76 which is disposed in a vicinity of the robot 70 and which adjunctively carries out the operation of fitting the projected workpiece WA. The table device 76 includes a support base 78 which supports the depressed workpiece WB, and a paralleling mechanism 80 which moves the support base 78 so that an attitude of the depressed workpiece WB can be changed. In other words, the table device 76 supports the depressed workpiece WB such that the attitude of the depressed workpiece WB can be changed. Note that the table device 76 can be regarded as a second robot.

The fitting system 68 includes a robot controller 82 which controls the robot 70. The robot controller 82 is electrically connected to a first interface 38 of the force sensor 10 (or 42). The robot controller 82 has a memory (not illustrated) in which a robot control program and the like for controlling the robot 70 are stored, and a microprocessor (not illustrated) which interprets and executes the robot control program.

The robot controller 82 carries out, in accordance with the robot control program, positional control on the robot 70 so that the projected workpiece WA is fitted into the depressed workpiece WB. Further, when the projected workpiece WA is to be fitted into the depressed workpiece WB, the robot controller 82 carries out, on the basis of computation results that have been outputted from the first interface 38, force control on the robot 70 so that an attitude and a position of the projected workpiece WA are adjusted. In other words, when the projected workpiece WA is to be fitted into the depressed workpiece WB, the robot controller 82 carries out the force control on the robot 70 so that a force and torque outputted from the first interface 38 are reduced.

The fitting system 68 includes a table controller 84 which controls the table device 76. The table controller 84 is electrically connected to the second interface 40 of the force sensor 10 (or 42). The table controller 84 has a memory (not illustrated) in which a table control program and the like for controlling the table device 76 are stored, and a microprocessor (not illustrated) which interprets and executes the table control program.

When the projected workpiece WA is to be fitted into the depressed workpiece WB, the table controller 84 carries out, on the basis of computation results that have been outputted from the second interface 40, force control on the table device 76 so that the attitude and a position of the depressed workpiece WB are adjusted. In other words, when the projected workpiece WA is to be fitted into the depressed workpiece WB, the table controller 84 carries out the force control on the table device 76 so that a force and torque outputted from the second interface 40 are reduced.

The fitting system 68 includes a main controller (not illustrated) which controls the entire fitting system 68 in an integrated manner. The main controller is electrically connected to the first interface 38, the second interface 40, the robot controller 82, and the table controller 84. The main controller determines whether or not differences between (i) the forces and the moments which have been outputted from the first interface 38 and (ii) the forces and the moments which have been outputted from the second interface 40 are each higher than an abnormality determination threshold. In a case where the differences are each higher than the abnormality determination threshold, the main controller determines that "the force sensor 10 (or 42) has an abnormality". In a case where the differences are each not higher than the abnormality determination threshold, the main controller determines that "the force sensor 10 (or 42) has no abnormality".

As illustrated in FIGS. 9 and 10, the robot controller 82 carries out the positional control on the robot 70 so that the hand 74 is located from its original position to a vicinity of a region in which the projected workpiece WA is placed. Next, the robot controller 82 controls the robot 70 so that the hand 74 holds the projected workpiece WA (step S101 in FIG. 10). The robot controller 82 then controls the robot 70 so that the hand 74 and the projected workpiece WA are located above the depressed workpiece WB on the support base 78 (step S102 in FIG. 10). With this, the operation of fitting the projected workpiece WA is started (step S103 in FIG. 10), and the force control on the robot 70 and the table device 76 is turned on (step S104 in FIG. 10).

When the projected workpiece WA is to be fitted into the depressed workpiece WB, the robot controller 82 carries out, on the basis of the computation results that have been outputted from the first interface 38, the force control on the robot 70 so that the attitude and the position of the projected workpiece WA are adjusted. The table controller 84 carries out, on the basis of the computation results that have been outputted from the second interface 40, the force control on the table device 76 so that the attitude and the position of the depressed workpiece WB are adjusted. It is possible to insert the projected workpiece WA into the depressed workpiece WB while adjusting the attitudes and the positions of the projected workpiece WA and the depressed workpiece WB (step S105 in FIG. 10).

In a case where the force in a Z-axis direction, which is one of the computation results that have been outputted from the first interface 38, is higher than a completion determination threshold, the robot controller 82 determines that insertion of the projected workpiece WA is completed (step S106 in FIG. 10). The completion determination threshold is a threshold in accordance with which it is determined whether or not an operation of inserting the projected workpiece WA is completed. Next, the robot controller 82 controls the robot 70 so that the hand 74 releases the projected workpiece WA (step S107 in FIG. 10). With this, the force control on the robot 70 and the table device 76 is turned off (step S108 in FIG. 10).

The robot controller 82 further controls the robot 70 so that the hand 74 is located above the projected workpiece WA and the table device 76 (step S109 in FIG. 10), so that the operation of fitting the projected workpiece WA is ended (step S110 in FIG. 10). The robot controller 82 carries out the positional control on the robot 70 so that the hand 74 is returned to its original position.

Namely, according to the configuration of Embodiment 3, as described above, when the projected workpiece WA is to be fitted into the depressed workpiece WB, the robot controller 82 carries out the force control on the robot 70 and the table controller 84 carries out the force control on the table device 76. Therefore, according to Embodiment 3, it is possible to reduce a takt time and fit the projected workpiece WA into the depressed workpiece WB in a short time, as compared with a case where the force control is carried out only on the robot 70.

As has been described, when the fitting workpiece (the projected workpiece WA) is to be fitted into the fitting target workpiece (the depressed workpiece WB), the robot controller (82) carries out, on the basis of a computation result that has been outputted from one (the first interface 38) of two systems of output sections, the force control on the robot (70) so that the attitude and the position of the fitting workpiece are adjusted. Further, the table controller (84) carries out, on the basis of a computation result that has been outputted from the other of the two systems of output sections (the second interface 40), the force control on the table device (76) so that the attitude of the fitting target workpiece is adjusted. Therefore, it is possible to reduce the takt time and fit the fitting workpiece into the fitting target workpiece in a short time, as compared with a case where the force control is carried out only on the robot.

Supplementary Note

The present invention is not limited to the above embodiments, but can be altered by a skilled person in the art within the scope of the claims. The present invention also encompasses, in its technical scope, any embodiment derived by combining technical means disclosed in differing embodiments.

REFERENCE SIGNS LIST

10 Force sensor, 12 Sensor base, 14 Force receiver, 16 Strain element (elastic support), 18 Core part, 22 Ring part, 26 Beam part (elastic part), 28 First detecting section (one of two systems of detecting sections), 30 Second detecting section (the other of the two systems of detecting sections), 34 First computing circuit (one of two systems of computing circuits), 36 Second computing circuit (the other of the two systems of computing circuits), 38 First interface (first output section, one of two systems of output sections), 40 Second interface (second output section, the other of the two systems of output sections), 42 Force sensor, 44 First strain element (elastic support), 46 Second strain element (elastic support), 48 First core part, 52 First ring part, 56 First beam part (elastic part), 58 Second core part, 62 Second ring part, 68 Fitting system, 70 Robot, 72 Arm, 74 Hand, 76 Table device, 82 Robot controller, 84 Table controller, WA Projected workpiece (fitting workpiece), WB Depressed workpiece (fitting target workpiece)

The invention claimed is:

1. A force sensor comprising:
a sensor base;
a force receiver which receives a force or a moment that acts on a detection target part;
an elastic support which is provided to the sensor base, which has, at least in part, an elastic part that is elastically deformable, and which supports the force receiver;
two systems of detecting sections which each independently detect strain or displacement of the elastic part of the elastic support;
two systems of computing circuits which each independently compute, on the basis of a detection result that has been outputted from a corresponding one of the two systems of detecting sections, the force or the moment that acts on the detection target part; and
two systems of output sections which each independently output, as an electrical signal, a computation result that has been outputted from a corresponding one of the two systems of computing circuits, wherein
the two systems of computing circuits are located in the sensor base,
one of the two systems of computing circuits computes, on the basis of one of the two systems of detecting sections, the force or the moment that acts on the detection target part, and
the other of the two systems of computing circuits computes, on the basis of the other of the two systems of detecting sections, the force or the moment that acts on the detection target part.

2. The force sensor as set forth in claim 1, wherein:
the elastic support is a strain element; and
the strain element includes
a core part which is fixed to the force receiver,
a ring part which is fixed to the sensor base and which surrounds the core part, and
a plurality of beam parts which serve as the elastic part, which are provided so as to be coupled to an outer circumferential surface of the core part and an inner circumferential surface of the ring part, and which are disposed at regular intervals along a circumferential direction.

3. The force sensor as set forth in claim 1, wherein:
the elastic support is constituted by a first strain element and a second strain element which are superposed on each other;
the first strain element includes
a first core part which is fixed to the force receiver,
a first ring part which is fixed to the sensor base and which surrounds the first core part, and
a plurality of first beam parts which serve as the elastic part, which are provided so as to be coupled to an outer circumferential surface of the first core part and an inner circumferential surface of the first ring part, and which are disposed at regular intervals along a circumferential direction;
the second strain element includes
a second core part which is fixed to the first core part of the first strain element,
a second ring part which is fixed to the sensor base and which surrounds the second core part, and
a plurality of second beam parts which serve as the elastic part, which are provided so as to be coupled to an outer circumferential surface of the second core part and an inner circumferential surface of the second ring part, and which are disposed at regular intervals along the circumferential direction; and one of the two systems of detecting sections detects strain or displacement of the plurality of first beam parts, and the other of the two systems of detecting sections detects strain or displacement of the plurality of second beam parts.

4. The force sensor as set forth in claim 1, wherein the two systems of detecting sections are two systems of strain gauge type detecting sections.

5. A fitting system comprising:
a robot which has an arm that is an articulated arm and a hand that is provided on an extreme end side of the arm and that holds a fitting workpiece;
the force sensor of claim 1, which is disposed between a base of the hand and an extreme end of the arm, and which detects a force or a moment that acts on the hand;
a table device which supports a fitting target workpiece such that an attitude of the fitting target workpiece can be changed;
a robot controller which, when the fitting workpiece is to be fitted into the fitting target workpiece, carries out, on the basis of a computation result that has been outputted from one of two systems of output sections of the force sensor, force control on the robot so that an attitude of the fitting workpiece is adjusted; and
a table controller which, when the fitting workpiece is to be fitted into the fitting target workpiece, carries out, on the basis of a computation result that has been outputted from the other of the two systems of output sections of the force sensor, force control on the table device so that the attitude of the fitting target workpiece is adjusted.

* * * * *